No. 732,398. PATENTED JUNE 30, 1903.
P. DIEHL.
CLUTCH DEVICE.
APPLICATION FILED NOV. 12, 1902.
NO MODEL.
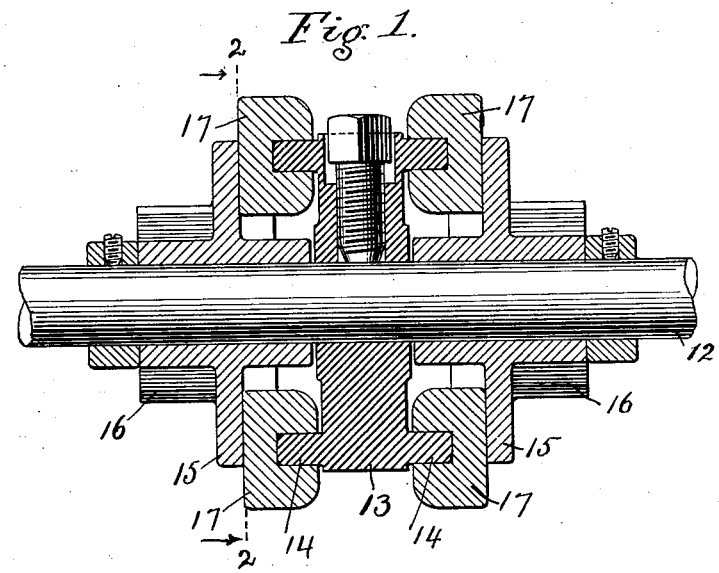
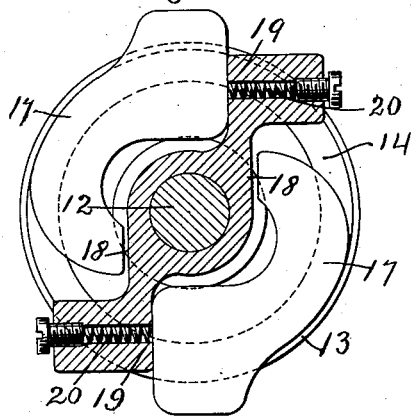
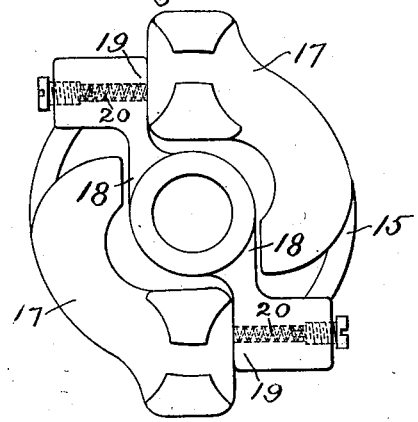
Witnesses: Inventor: Philip Diehl
By his Attorney No. 732,398. Patented June 30, 1903.

UNITED STATES PATENT OFFICE.

PHILIP DIEHL, OF ELIZABETH, NEW JERSEY, ASSIGNOR TO THE SINGER MANUFACTURING COMPANY, A CORPORATION OF NEW JERSEY.

CLUTCH DEVICE.

SPECIFICATION forming part of Letters Patent No. 732,398, dated June 30, 1903.

Application filed November 12, 1902. Serial No. 130,981. (No model.)

*To all whom it may concern:*

Be it known that I, PHILIP DIEHL, a citizen of the United States, residing at Elizabeth, in the county of Union and State of New Jersey, have invented certain new and useful Improvements in Clutch Devices, of which the following is a specification, reference being had therein to the accompanying drawings.

This invention relates to that class of power-transmitting clutch devices adapted to impart continuous rotary motion to a driving-shaft from an oscillating or rotary reciprocating member or members; and the invention has for its object to provide a clutch mechanism of the class referred to which will be so positive in its driving action that slip or failure to act of the clutching part or parts will not under any circumstances occur and in which the clutching part or parts will be so quickly and positively released as to avoid friction or drag on the driven part or parts, such as is liable to occur where clutching parts are not properly or quickly released at reverse movements of oscillating driving parts.

To this end the improved clutch mechanism comprises in its preferred form a hub fixed relative to the shaft to be driven, and which hub is provided at its opposite faces or ends with annular ribs or flanges, and loosely mounted on the said shaft are oscillating disks provided with driving-pinions. Between the said disks and the end faces of said hub are interposed clutch-dogs, the outer parts of which are slotted or notched to embrace and bite upon the said annular ribs or flanges, and the said disks are provided with arms or projections of such form as to engage the inner ends or parts of the clutch-dogs to effect the biting clutching action and also to engage the outer parts of the clutch-dogs adjacent to their biting parts to secure quick releasing action at the reverse movements of the driving-disks.

In the accompanying drawings, Figure 1 is a longitudinal section of the improved clutch mechanism. Fig. 2 is a transverse section of the same on line 2 2, Fig. 1, and Fig. 3 is an inside view of one of the driving-disks with the clutch-dogs in place relative thereto.

Referring to the drawings, 12 denotes a shaft to be driven and to which may be fixed a pulley for transmitting power and which may be the driving-pulley of a sewing-machine stand or other similar device. Fixed relative to the shaft 12 is a hub 13, which might be the hub of the driving wheel or pulley, but which will preferably be separate therefrom. The hub 13 is provided at its opposite faces or ends with annular ribs or flanges 14. Loosely mounted on the shaft 12 are driving-disks 15, provided with pinions 16, which are preferably integral with said disks. Interposed between the driving-disks 15 and the annular ribs or flanges of the hub are clutch-dogs 17, slotted or notched at their outer parts or ends to embrace the said ribs or flanges, and the said disks are provided on their inner faces with suitable projections to engage the said clutch-dogs to cause their biting and releasing actions. These projections, as herein shown, are in the form of tangential arms, the parts 18 of which engage the clutch-dogs remote from their gripping parts and preferably at their inner ends, and the parts 19 of said arms impinge against the said clutch-dogs at or near their outer ends and at or closely adjacent to the biting parts thereof, so as to cause a quick release of the biting action of the said dogs at the reverse movements of the oscillating driving-disks.

To take up looseness and prevent rattling, light coil-springs 20 are preferably housed in the parts or projections 19. These springs are not, however, positively essential, as the clutch device will operate well without them.

The improved clutch device is more particularly intended for use in a treadle mechanism such as is shown and described in my United States Patent No. 630,194, in which rotary reciprocating pinions are operated by segment-gears connected with alternately-swinging treadles; but it will be obvious that the present invention may be utilized for other purposes or in other mechanisms in transmitting power. It will also be understood that a single oscillating driving-disk operating in connection with a single annular flange on a hub between which and the driving-disk either one or two positively-engaged and positively-released clutch-dogs may be employed without departing from the essence of the invention.

In the operation of the present improved clutch device a positive biting action is imparted to the clutch-dogs by a tangential engagement of the parts or projections 18 of the driving-disks with the inner ends of said dogs and by which the said inner ends of the said dogs are forced outward tangentially in such a manner as to get a quick and positive clutching action, while at the releasing action of the clutch-dogs the positive engagement therewith of the parts or projections 19 close to the gripping parts of said dogs will result in a quick and positive releasing action, so that frictional drag of the dogs on the annular ribs or flanges of the hub at the reverse movements of the oscillating driving-disks will be reduced to a minimum.

Having thus described my invention, I claim and desire to secure by Letters Patent—

1. In a clutch mechanism, the combination with a hub provided with an annular rib or flange, of a clutch-dog slotted or notched to embrace and grip the said rib or flange, and an oscillating device having rigid parts adapted to positively engage the said clutch-dog at a point remote from its gripping portion, to cause the gripping clutch action, and also positively engaging said clutch-dog adjacent to its gripping part to cause a quick and positive releasing action.

2. In a clutch mechanism, the combination with a shaft having a fixed hub provided with an annular rib or flange, of one or more clutch-dogs slotted or notched to embrace and grip the said rib or flange, an oscillating driving-disk loosely mounted on said shaft and provided with rigid projections or parts engaging said dog or dogs at points remote from their gripping parts, to cause positive gripping action, and also engaging said dog or dogs at points adjacent to their gripping parts, to cause a positive releasing action, and a pinion rigid with said driving-disk.

3. In a clutch mechanism, the combination with a shaft having a fixed hub or wheel provided with an annular rib or flange, of a driving-disk loosely mounted on said shaft and having at its outer end a pinion and on its inner face rigid parts or projections, clutch-dogs interposed between said driving-disk and said hub or wheel and notched for engagement with said rib or flange, said clutch-dogs being alternately engaged at or near their opposite ends by said rigid parts or projections of said driving-disk, when the latter is in operation, for causing gripping and releasing actions of said clutch-dogs.

4. In a clutch mechanism, the combination with a shaft having a fixed hub or wheel provided with an annular rib or flange, of clutch-dogs slotted or notched to embrace and grip the said rib or flange, and an oscillating disk having a fixed pinion and provided on its inner face with rigid parts, or projections 18 arranged to engage the said clutch-dogs at or near their inner ends and at points remote from their gripping parts, to cause a positive gripping action, said disk having also rigid parts or projections 19 arranged to engage the said clutch-dogs adjacent to their gripping parts to cause quick and positive releasing action.

5. In a clutch mechanism, the combination with a shaft having a fixed hub or wheel provided with an annular rib or flange, of clutch-dogs slotted or notched to embrace and grip the said rib or flange, an oscillating disk having a fixed pinion and provided on its inner face with rigid parts, or projections 18 arranged to engage the said clutch-dogs at or near their inner ends and at points remote from their gripping parts, to cause a positive gripping action, said disk having also rigid parts or projections 19 arranged to engage the said clutch-dogs adjacent to their gripping parts to cause quick and positive releasing action, and coil-springs housed in the parts or projections 19, to take up looseness and prevent rattling.

6. In a clutch mechanism, the combination with the shaft 12, of the hub 13 fixed thereto and provided at its opposite faces with the annular ribs or flanges 14, the driving-disks 15 loosely mounted on said shaft and provided with the pinions 15 and having the rigid parts or projections 18 and 19 on their inner faces, and the clutch-dogs 17 notched to embrace the said ribs or flanges and engaged at or near their inner and outer ends, respectively, by the said rigid parts or projections 18 and 19, to cause alternate gripping and releasing action of said dogs.

7. In a clutch mechanism, the combination with the shaft 12, of the hub 13 fixed thereto and provided at its opposite faces with the annular ribs or flanges 14, the driving-disks 15 loosely mounted on said shaft and provided with the pinions 15 and having the rigid parts or projections 18 and 19 on their inner faces, the clutch-dogs 17 notched to embrace the said ribs or flanges and engaged at or near their inner and outer ends, respectively, by the said rigid parts or projections 18 and 19, to cause alternate gripping and releasing actions of said dogs, and coil-springs 20 housed in said parts or projections 19.

In testimony whereof I affix my signature in presence of two witnesses.

PHILIP DIEHL.

Witnesses:
HENRY J. MILLER,
HENRY A. KORNEMANN.